United States Patent
Ojeda Castaneda et al.

(10) Patent No.: US 8,159,753 B2
(45) Date of Patent: Apr. 17, 2012

(54) OPTICAL SYSTEM WITH VARIABLE FIELD DEPTH

(75) Inventors: Jorge Ojeda Castaneda, Guanajuato (MX); Eduardo Aguilera Gomez, Guanajuato (MX); Hector Plascencia Mora, Guanajuato (MX); Miguel Torres Cisneros, Guanajuato (MX); Elias Rigoberto Ledesma Orozco, Guanajuato (MX); Alejandro Leon Martinez, Guanajuato (MX); Jose Sergio Pacheco Santamaria, Guanajuato (MX); Juan Gerardo Martinez Castro, Guanajuato (MX); Roberto Carlos Salas Segoviano, Guanajuato (MX)

(73) Assignee: Universidad de Guanajuato, Guanajuato (MX)

( * ) Notice: Subject to any disclaimer, the term of this patent is extended or adjusted under 35 U.S.C. 154(b) by 145 days.

(21) Appl. No.: 12/790,139

(22) Filed: May 28, 2010

(65) Prior Publication Data

US 2011/0292516 A1    Dec. 1, 2011

(51) Int. Cl.
*G02B 9/00* (2006.01)
*G02B 9/04* (2006.01)

(52) U.S. Cl. ..................... 359/652; 359/793

(58) Field of Classification Search .................. 359/558, 359/652–654, 793
See application file for complete search history.

(56) References Cited

U.S. PATENT DOCUMENTS

| | | |
|---|---|---|
| 3,305,294 A | 2/1967 | Alvarez |
| 5,748,371 A | 5/1998 | Cathey, Jr. et al. |
| 6,927,922 B2 | 8/2005 | George et al. |
| 7,218,448 B1 | 5/2007 | Cathey, Jr. et al. |
| 2004/0145808 A1* | 7/2004 | Cathey et al. ............. 359/558 |

* cited by examiner

*Primary Examiner* — William Choi
(74) *Attorney, Agent, or Firm* — Panitch Schwarze Belisario & Nadel LLP

(57) ABSTRACT

An optical lens which, in a controlled manner, and without altering either the resolution or luminous capture, helps to extend the depth of field of any other optical system. The optical lens of the present invention is composed of two optical lenses that form a pair. Each of the lenses of the pair produces a change of optical path with a symmetrical distribution. If there is no relative displacement, the lenses of the pair generate an optical path difference equal to zero. When there is relative displacement, the lenses of the pair generate a change of optical path with asymmetric distribution, which helps to extend the depth of field without reducing either the resolution or luminous capture. The optical lens of this invention, in the form of an optical pair, serves any other optical system to capture images without loss of modulation, but with attenuated modulation which can be retrieved with digital processing algorithms known in the art.

16 Claims, 8 Drawing Sheets

OPTICAL SYSTEM WITH VARIABLE FIELD DEPTH

CROSS-REFERENCE TO RELATED APPLICATIONS

This application claims priority from Mexican Application No. MX/a/2010/005782, having a filing date of May 27, 2010 with the title "Sistema Óptico Con Profundidad de Campo Variable". The disclosure of Mexican Application No. MX/a/2010/005782 is incorporated by reference herein in its entirety.

BACKGROUND OF THE INVENTION

It is advisable to describe an optical system that captures the image, of a three-dimensional object, as a process of transfer between planes. By using an optical system, only one plane of the object is well focalized on the plane in which the image is detected. The other planes of the object are not well focalized on the plane where the image is detected. It is common to indicate that for the other planes of the object, the optical system suffers from focalization errors.

The tolerance with which the optical system is able to capture the other levels of the object, is called depth of field, which is controlled by opening or closing the opening of the pupil of the optical system. Closing the pupil results in a larger depth of field. However, closing the pupil also reduces the resolution and the luminous capture of the optical system, as described in Leo Levi, Applied Optics: A Guide to Optical System Design/Volume I. (Wiley, 1968) ISBN-10: 0471531103. In order to preserve the resolution and luminous capture of the optical system it is necessary to find a new method for depth of field control.

In the past two decades, several devices were designed to maintain high resolution and extend the depth of field, moderately and selectively easing some parts of the pupil. See for example the publication "Improvement in the OTF of a Defocused Optical System Through the Use of Shade Aperture," Appl. Opt. 10, 2219 (1971) J. Ojeda-Castaneda, L R Berriel-Valdes, and E. Montes, "Line Spread Function Relatively Insensitive to Defocus," Opt. Lett. 8.458 (1983); G. Indebetow and H. Bai, "Imaging with Fresnel Zone Pupils Masks: Extended Depth of Field," Appl. Opt. 23, 4299 (1984) J. Ojeda-Castaneda, L R Berriel-Valdes, and E. Montes, "Spatial Filter for Increasing the Depth of Focus," Opt. Lett. 10, 520 (1985) J. Ojeda-Castaneda, P. Andres, and A. Diaz, "Annular Apodized for Low Sensitivity to Defocus and to Spherical Aberration," Opt. Lett. 11, 487 (1986). These designs lead to the conclusion that to maintain a pre-specified resolution, it is possible to form images of various planes of the object, but the cosine variations (in other planes of the object) are formed with attenuated amplitude. Consequently, there must be several families of lenses that (for a pre-specified resolution) extend depth of field with images showing cosine variations with low amplitude. Since these images only require a boost in its amplitude, this is accomplished using restoration algorithms known in the technique.

From these last findings, to extend depth of field, new designs are intended to reduce the influence of the focalization errors, thus avoiding cosine amplitude variations being zero. Once the images are captured, the amplitude is restored with algorithms known in the technique, as discussed in patents U.S. Pat. Nos. 6,927,922 and 7,218,448.

To find a new method of depth of field control, it is advisable to mathematically model the image forming optical system as a linear system, see e.g. the book "Introduction to Fourier Optics" by Joseph W. Goodman (McGraw-Hill, 1996), ISBN-10: 0070242542.

A linear model is represented by an optical transference function. The optical transference function module is the function of the modulation transference. This new function specifies with which new amplitude the starting amplitude of a cosine variation which is localized in one of the object's plane is detected (in the image plane). The transference function of the modulation specifies the amplitude transference for each frequency of the cosine variation, and is therefore useful to represent the quality of an optic system, and there relies the convenience to evaluate that function. For this purpose the mathematical operation of autocorrelation of the generalized pupil function is performed, which describes the transmittance in complex amplitude of the optic system. The generalized pupil function is a complex one, which results from multiplying the real function which represents the physical pupil aperture by the transmittance in complex amplitude of the optic filter, which is localized on top of the pupil aperture. In a conventional system, the transmittance in complex amplitude of the optic filter equals one. However, in order to improve the modulation transference function, and consequently improve the quality of the image, it is necessary to modify the transmittance in complex amplitude of the optic filter, as shown in: J. Ojeda-Castaneda and L. R. Berriel-Valdos, "Arbitrarily high focal depth with finite apertures," Opt. Lett. 13, 183-185 (1988); "Zone plate for arbitrarily high focal depth", J. Ojeda-Castañeda and L. R. Berriel-Valdos, Applied Optics, Vol. 29, No. 7, pp. 994-997 (1990).

To take into account the influence of the focalization errors it is necessary to incorporate a quadratic phase factor in the coordinates of the pupil. In the latter case, it is convenient to use the mathematical formalism of the function of ambiguity, associated with complex amplitude transmittance of optical filter. The mathematical formalism of the function of ambiguity to identify the complex amplitude transmittance optical filter is less sensitive to focalization errors, as discussed in J. Ojeda-Castaneda, L R Berriel-Valdes, and E. Montes, "Ambiguity function as a design tool for high focal depth, " Appl. Opt. 27, 790-795 (1988).

To reduce the impact of the focalization errors, without affecting the resolution and luminous capture of the optical system, a transmittance in complex amplitude is searched which is only a function only of the phase. A transmittance in complex amplitude that reduces the impact of focalization error, is able to extend the depth of field to a specific value, which is determined by the maximum difference in optical path introduced by the optical filter as described in the patent U.S. Pat. No. 5,748,371 and in publications ER Dowski and TW Cathey, "Extended depth of field-through wave-front coding," Appl. Opt. 34, 1859-1865 (1995); A. Sauceda and J. Ojeda-Castaneda, "High focal depth with fractional-power wave Fronts," Opt. Lett. 29, 560-562 (2004); A. Castro and J. Ojeda-Castaneda, "Asymmetric phase masks for extended depth of field," Appl. Opt. 43, 3474-3479 (2004); A. Castro, J. Ojeda-Castaneda, and AW Lohmann, "Bow-tie effect: differential operator," Appl. Opt. 45, 7878-7884 (2006).

U.S. Pat. No. 5,748,371 describes a method to extend depth of field to a specific value using only one lens. In the present invention a method to extend the depth of field in a controlled manner from a minimum to a maximum value using a pair of glasses is protected. This is possible by varying, in a controlled manner, the optical path difference that the proposed lens is capable of generating.

One possible way to vary, in a controlled manner, the difference in optical path, is applying the methodology described in the patent U.S. Pat. No. 3,305,294, which describes a method to vary optical power by the lateral displacement between two lenses, which have a profile that varies as a cubic polynomial.

Unlike U.S. Pat. No. 3,305,294, in the present invention, a method to vary depth of field is protected, while in U.S. Pat. No. 3,305,294, a method to vary optical power is described.

In other words, the present invention describes a method to vary depth of field extension in a controlled way, while in U.S. Pat. No. 5,748,371 depth of field extension is constant. The present invention describes a method to extend depth of field, while in U.S. Pat. No. 3,305,294 a method for varying optical power is described.

BRIEF SUMMARY OF THE INVENTION

A process and a device to control the depth of field of an optical system, by means of the displacement between two lenses that make up the pair, which is capable of generating an optical path difference with antisymmetric distribution.

An optical system composed of one or several lenses already known in the technique, which may include an image processing system, also known in the technique, and includes one or more pairs of lenses that generate optical path difference with a symmetrical distribution, which occurs with relative movement between the lenses that form the pair. The transmittance in complex amplitude of a lens in the pair is the complex conjugate of the transmittance in complex amplitude of the other lens.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 1b shows that between 1 and 2 there is relative displacement.

In (16) an image with focalization errors is shown, obtained by an optical system known in the technique. In (17) an image with focalization errors is shown, obtained by an optical system with the lens of the present invention before the restoration. In (18) an image with focalization errors is shown, obtained by an optical system with the lens of the present invention after the restoration. In (19) an image with large focalization errors is shown, obtained by an optical system known in the technique. In (20) an image with large focalization errors is shown, obtained by an optical system with the lens of the present invention before the restoration. In (21) an image with large focalization errors is shown, obtained by an optical system with the lens of the present invention after the restoration. It can be seen from (15) (18) and (21) that images obtained using the lens of the present invention has quality regardless of the focalization error. Therefore, the present invention is able to extend depth of field.

Figure 7A:
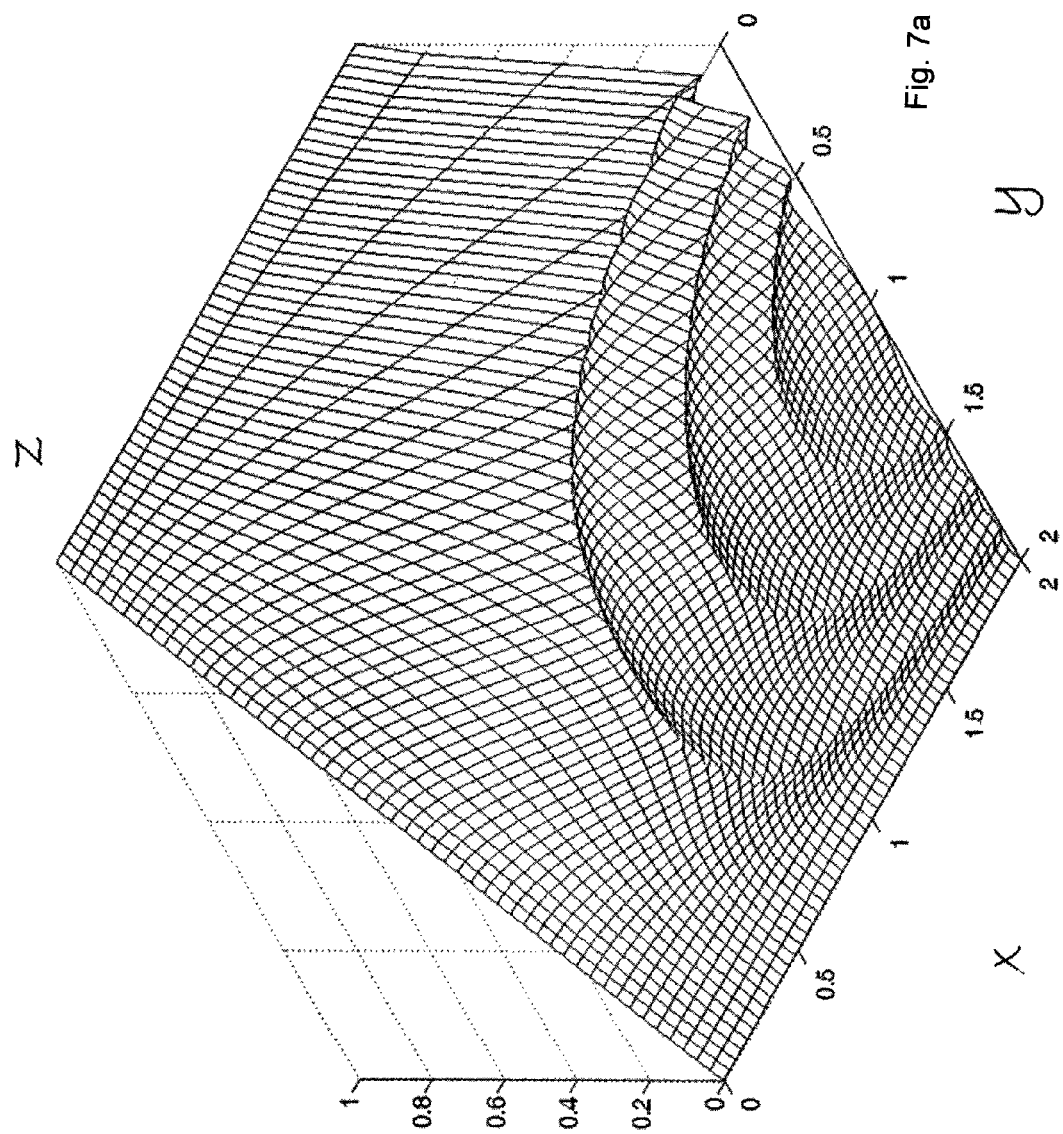

FIG. 7a shows the transfer function of the modulation achieved with a conventional lens known in the technique, or with the lens of the present invention if there is no relative displacement between the lenses of the pair.

Figure 7B:
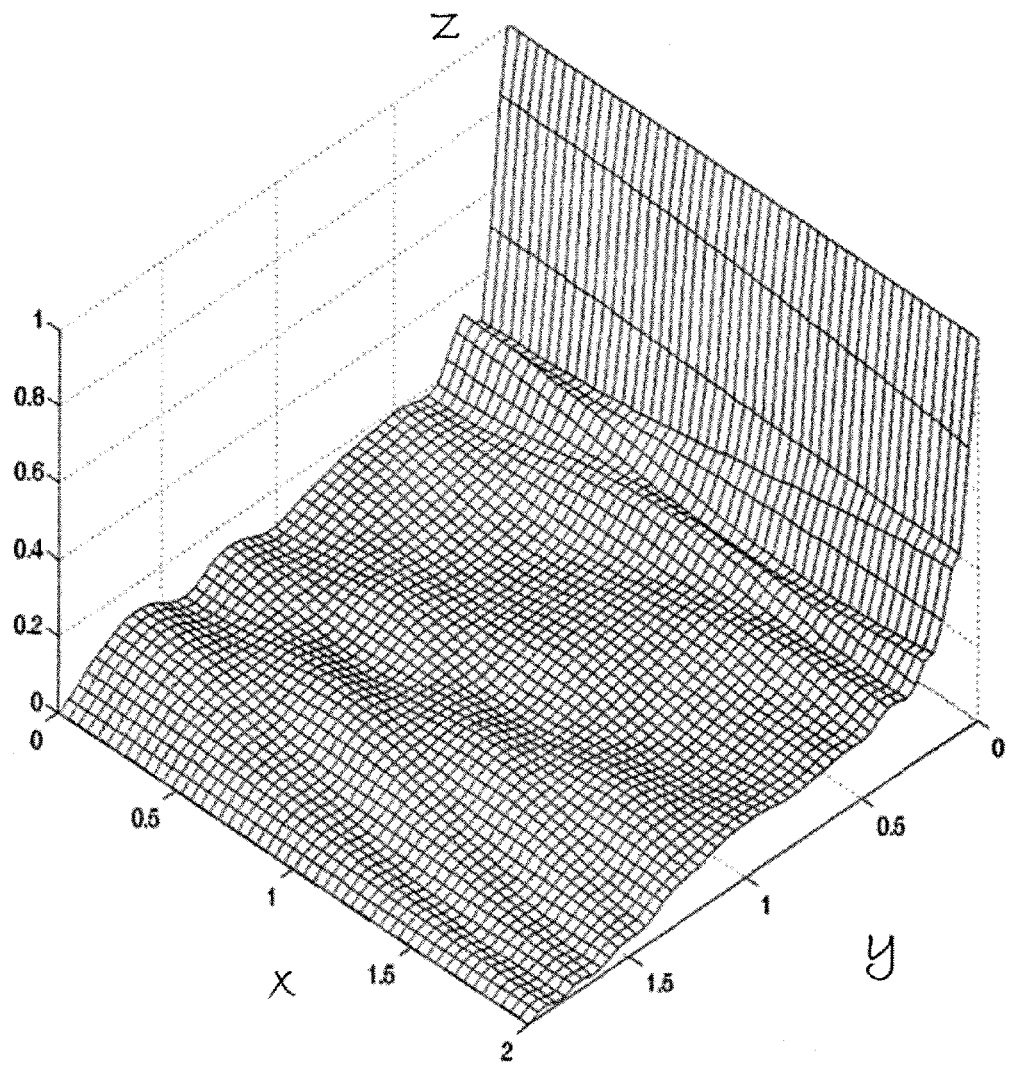

FIG. 7b shows the transfer function of the modulation which is achieved with the lens of the present invention, having a relative displacement between the lenses of the pair.

DETAILED DESCRIPTION OF THE INVENTION

The present invention consists in an optical lens which in turn is formed by two lenses to form the pair. A lens in the pair has a complex amplitude transmittance which describes an optical path difference with symmetric distribution. The complex amplitude transmittance of a lens in the pair is the complex conjugate of the complex amplitude transmittance of the other lens of the pair.

In mathematical terms, it is convenient to denote the coordinate in the pupil by the letter $\alpha$, and its range of variation $(-\Omega, \Omega)$ is the opening of the pupil. The complex amplitude transmittance of the first lens of the pair is denoted as $$T_1(\alpha) = \exp[i\, 2\pi a\, \phi(\alpha)] \qquad (1)$$

In Equation 1, the maximum optical path difference is $a$, and the function $\phi(\alpha)$ is a real function whose values are bounded between $-1$ and $1$. It is worth noting that to make a lens with the optical path difference $\phi(\alpha)$, that this difference depends on the variations of the refractive index $N(\alpha)$ as on variations of the profile of the lens $f(\alpha)$. In mathematical terms, $$\phi(\alpha) = [N(\alpha) - 1] f(\alpha) \qquad (2)$$

Figure 1:
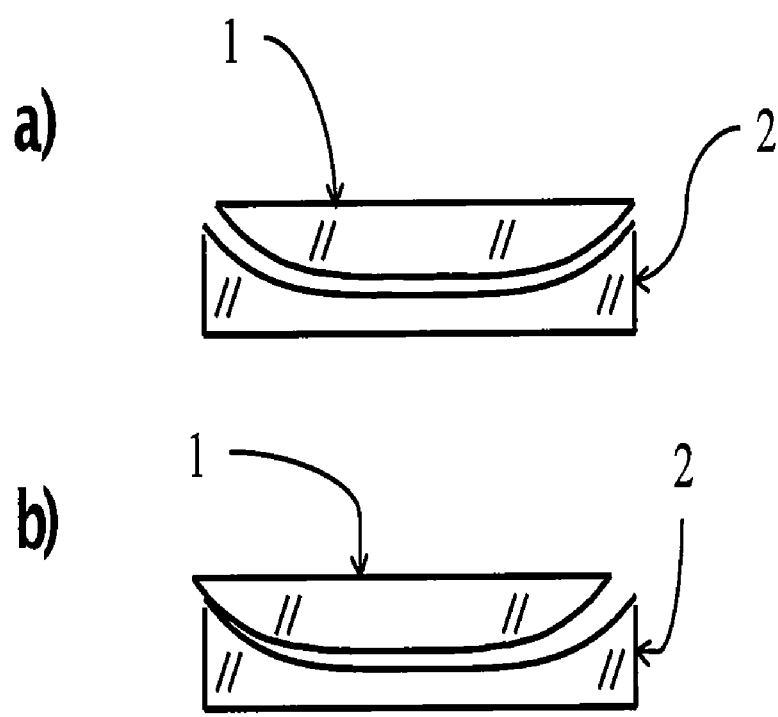
FIG. 1 a shows a side view of lenses 1 and 2, which constitute the pair that integrates the lens proposed in this invention. There is no relative displacement between 1 and 2.
Figure 2:
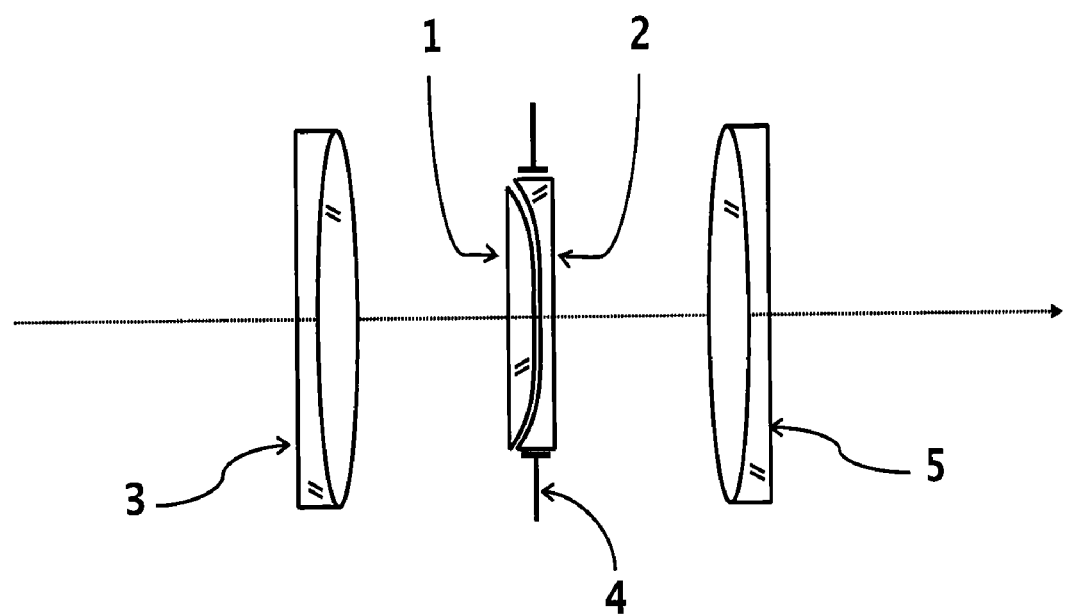
FIG. 2 shows a schematic diagram from the side when the proposed lens (1 and 2) is located in the pupil (4) of a telecentric optical system (3 and 5) as is common in optical image processing.
Figure 3:
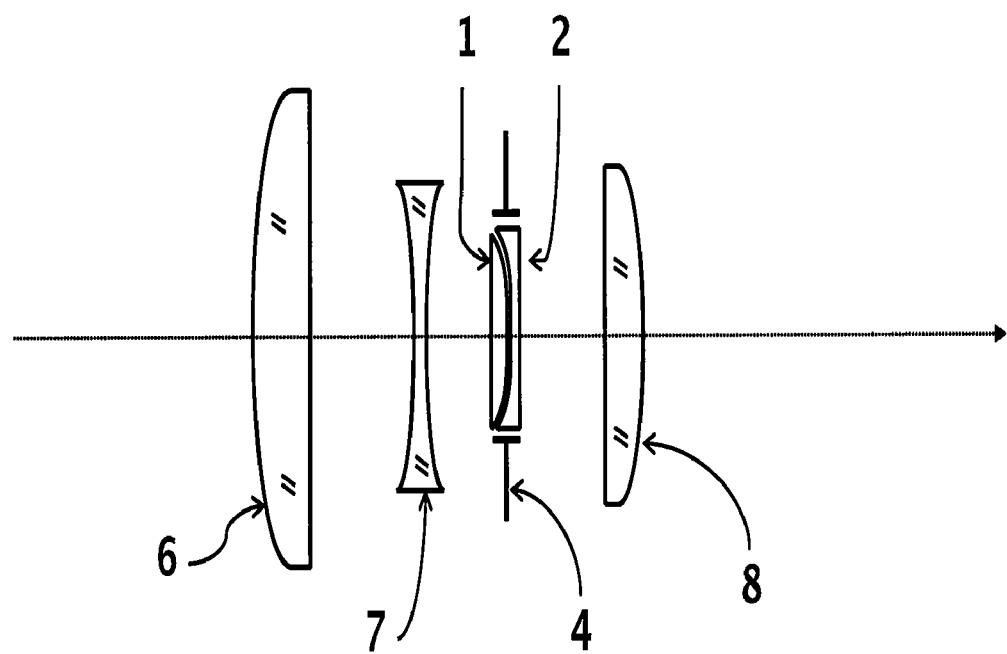
FIG. 3 shows in a schematic lateral diagram the use of the proposed lens (1 and 2), located in the pupil (4), of a Cooke's triplet (6, 7 and 8) as is commonly used as a photographic objective.
Figure 4:
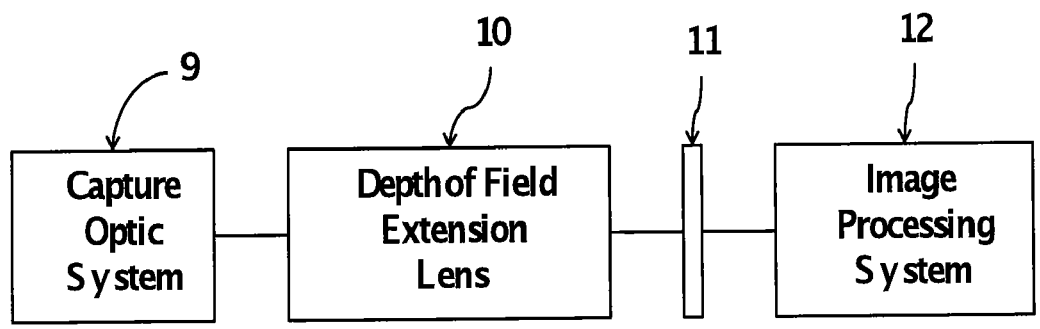
FIG. 4 presents a block diagram of the use of the proposed lens (10) in an optical catchment system (9), a detection system (11), and a signal and/or image processing system (12).
Figure 5:
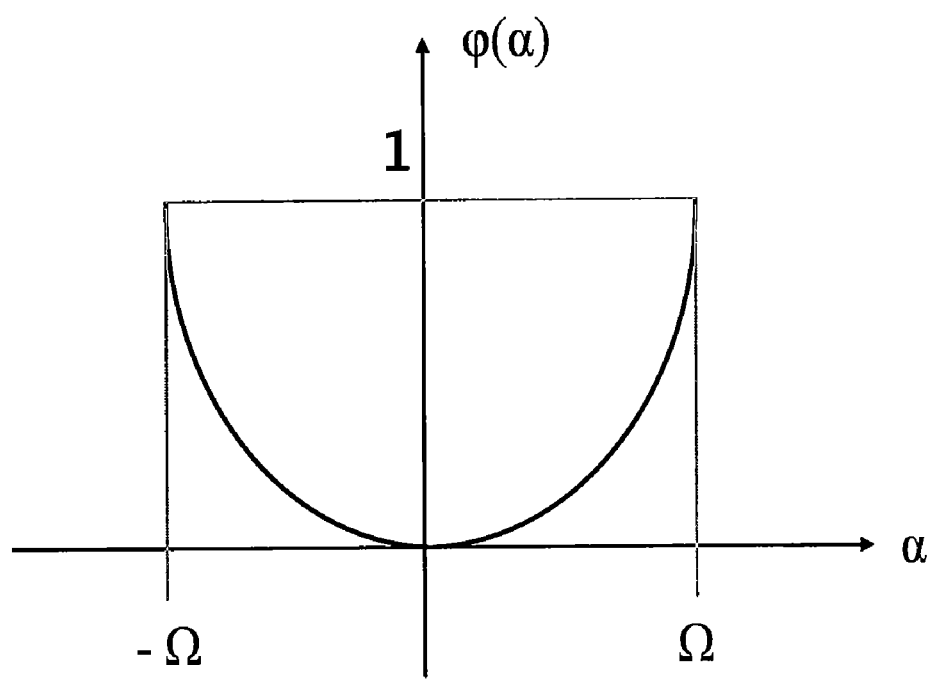
FIG. 5 shows a graph where the horizontal axis denotes the variation of the pupil coordinate a, and the vertical axis denotes the variation in optical path difference $\phi(\alpha)$.

FIG. 5 displays an example of a symmetrical distribution for the function $\phi(\alpha)$. The complex amplitude transmittance of the second lens of the pair is defined by $$T_2(\alpha) = T_1^*(\alpha) = \exp[-i\, 2\pi a \phi(\alpha)] \qquad (3)$$

In Equation 3, the asterisk denotes the conjugate complex. However, if there is a displacement $v$ between optical lenses that constitute the pair, it generates the following transmittance in complex amplitude $$T(\alpha; v) = T_1(\alpha + v/2) T_2(\alpha - v/2) = T_1(\alpha + v/2)\, T_1^*(\alpha - v/2) \qquad (4)$$

When using equation 1, in equation 4, the latter can be expressed as $$T(\alpha; v) = \exp\{i\, 2\pi a [\phi(\alpha + v/2) - \phi(\alpha - v/2)]\} \qquad (5)$$

In the present invention it is selected that the function $\phi(\alpha)$ is a symmetric function in the variable $\alpha$, with the property that the optical path difference in equation 5 is an antisymmetric distribution in the variable $\alpha$. This means, that respectively it must be met that $$\phi(\alpha)=\phi(-\alpha) \quad (6)$$

$$\phi(\alpha+\upsilon/2)-\phi(\alpha-\upsilon/2)=-[\phi(\alpha-\upsilon/2)-\phi(\alpha+\upsilon/2)] \quad (7)$$

The conditions for optical path differences expressed in equations 6 and 7 are clarified below with two examples.

EXAMPLES

The following is a discussion of a new optical path distribution of $\phi(\alpha)$ that exemplifies the present invention. If selected $$\phi(\alpha)=\cos(\pi\alpha/2\Omega) \quad (8)$$

In equation 8 the Greek letter $\Omega$ denotes (as shown above in equation 1) the upper limit of $\alpha$. It should be recognized in equation 8 that the function $\cos(\pi\alpha/2\Omega)$ is a symmetric function in $\alpha$, so it is straightforward to verify that equation 8 complies with the condition of equation 6. Additionally, from equation 8 it is easily obtained that the optical path difference is $$\phi(\alpha+\upsilon/2)-\phi(\alpha\alpha\upsilon/2)=-[2\,\text{sen}(\pi\upsilon/4\Omega)]\,\text{sen}(\pi\alpha/2\Omega) \quad (9)$$

Again, it is straightforward to verify that the result of equation 9 satisfies the condition in equation 7.

Additionally, obtained from equation 9, is that the function $\sin(\pi\alpha/2\Omega)$ is amplified by the factor $[2\text{sen}(\pi\upsilon/4\Omega)]$. The amplification factor depends only on the variable $\upsilon$, which is known to represent the displacement between the two lenses in the pair used in the present invention. Thus for zero displacement, $\upsilon=0$, the optical path difference in equation 9 is zero. However, for values of $\upsilon$ different than zero, the multiplication factor can be increased. Thus, through the displacement $\upsilon$ is possible to control the amplification factor of the function $\sin(\pi\alpha/2\Omega)$. This new illustrative example clarifies the methodology used to control the optical path difference described by the function $\sin(\pi\alpha/2\Omega)$.

However, on the other hand, if you use the function $\sin(\pi\alpha/2\Omega)$ with a fixed amplification factor, then it is possible to extend the depth of field as it is known from the publication of A. Castro, J. Ojeda-Castañeda, and A W Lohmann, "Bow-tie effect: differential operator," Appl. Opt. 45, 7878-7884 (2006).

Figure 6:
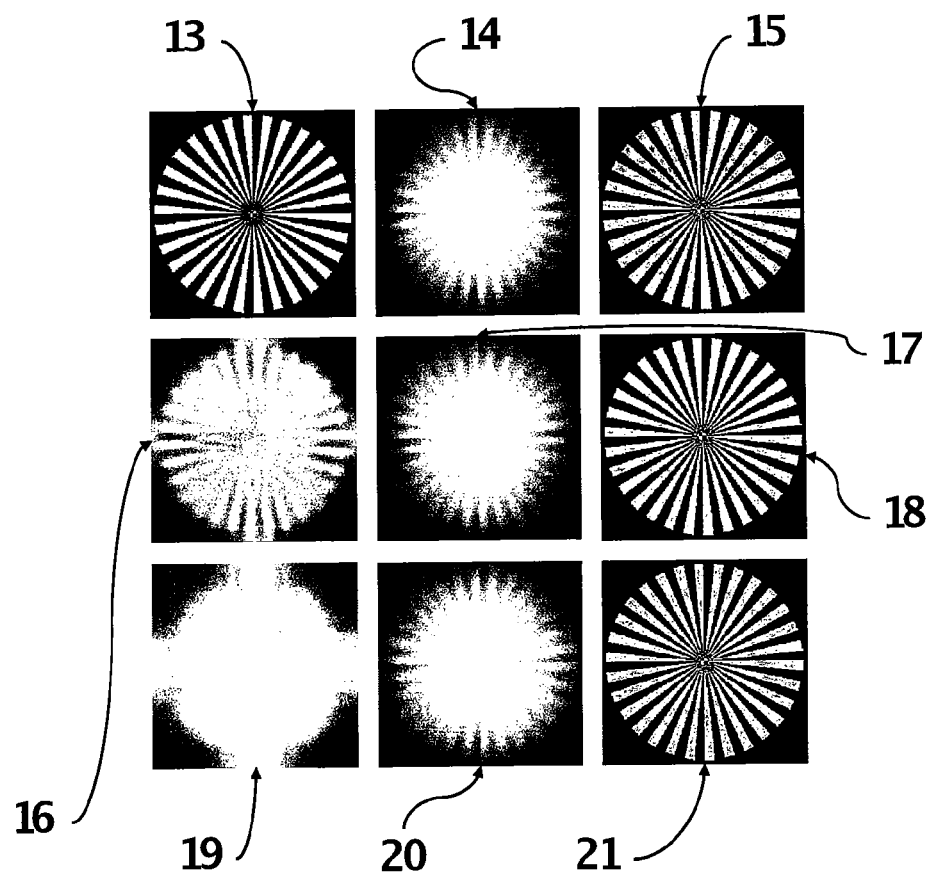
FIG. 6 displays nine numerical simulations of the images captured by an optical system. By using an optical system known in the technique (13) images obtained using a system with the lens of the present invention, without using digital processing (14), and images obtained using a system with the lens of the present invention after restoring the detected amplitude (15).

In this last publication is shown that an optical path difference in the form $\sin(\pi\alpha/2\Omega)$ extends the depth of field, as seen in the numerical simulations shown in FIG. 6. In this figure, it is shown along the rows both the focalized image as well as the image with focalization errors. Throughout the first column of FIG. 6 the images obtained with an optical system known in the technique are shown. The second column of FIG. 6 shows images obtained with the lens of the present invention without the use of restoration, and the third column shows images obtained using the lens of the present invention and restoration algorithms known in the technique.

It is important to emphasize that the extension in depth of field achieved in the publication "Bow-tie effect: differential operator," Appl. Opt. 45, 7878-7884 (2006) using only one lens with built-in optical path difference of the type $\sin(\pi\alpha/2\Omega)$, has the same limitation as that reported in the U.S. Pat. No. 5,748,371. In both cases the field extension is fixed. In the present invention, by using two lenses it is achieved that the optical path difference of the type $\sin(\pi\alpha/2\Omega)$ is amplified by the factor $[2\sin(\pi\upsilon/4\Omega)]$. So, it is possible to control the extent of depth of field.

A similar result to that already discussed can be obtained with the use of the function in equation 1, if using a lens with complex amplitude transmittance rate $$T_1(\alpha)=\exp[i\,2\pi a(\alpha/\Omega)^4] \quad (10)$$

This transmittance in complex amplitude reported in the publication by Jorge Ojeda-Castañeda, JEA Landgrave, Cristina M. Gómez-Sarabia, "Conjugate phase plate use in analysis of the frequency response of optical systems designed for extended depth of field." The transmittance in complex amplitude in equation 10 is another example of using the methodology proposed in the present invention.

FIG. 7*a* shows the transfer function of the modulation which is obtained using a conventional lens, known in the technique, or by using the lens of the present invention without relative displacement between the lenses that make up the pair. The focalizing error is plotted in the x axis. The frequency of the cosine variation is plotted the y axis. How well amplitudes are transferred in cosine variations is plotted in the z axis. One can see that by increasing the focalization error, transfer of amplitudes is damped and zeros appear in the transfer process. That results in loss of information.

FIG. 7*b* shows the transfer function of the modulation which is obtained using the lens of the present invention with relative displacement between the lenses that make up the pair. Focalization error is plotted in the x axis. The frequency of the cosine variation is plotted in the y axis. How well amplitudes of the cosine variations are transferred is plotted in the z axis. One can see that the z axis changes are smooth with respect to change in the x axis. Thus, transfer of the amplitudes is relatively insensitive to focalization errors. This means that no information is lost.

The lens of the present invention can be used to reduce the length of zoom lenses, to optimize photolithography processes, to extend depth of field in robotic vision, in microscopy, for ground-based telescopes, photographic lens, and image acquisition systems for mobile phones and personal computers.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An optical system with variable depth of field, comprising at least one pair of lenses, wherein each pair of lenses includes a first and a second lens, the first lens having a complex amplitude transmittance which generates an optical path difference which is equivalent to a surface which has a profile which follows a symmetrical mathematical function, and wherein a complex amplitude transmittance of the second lens of the pair is the conjugate complex of the first lens.

2. The optical system with variable field of depth according to claim 1, wherein the optical system is configured to move the first or second lens relative to one another.

3. The optical system with variable field of depth according to claim 1, further comprising additional types of lenses.

4. The optical system with variable field of depth according to claim 1, further comprising an image processing system.

5. The optical system with variable field of depth according to claim 1, further comprising at least one positioning system for any of the first or second lenses.

6. An optical system with variable depth of field, comprising at least one pair of lenses, wherein each pair of lenses includes a first and a second lens, the first lens having a complex amplitude transmittance generated by a surface which has a profile which follows a symmetrical mathematical function, and wherein the complex amplitude transmittance of the second lens in the pair is the conjugate complex of the first lens, and wherein the surface of the second lens in the pair is a geometric complement to form a block with parallel faces.

7. An optical system with variable depth of field, comprising at least one pair of lenses, wherein each pair of lenses comprises a combination of the first or second lens according to claim 6, and a third or fourth lens, wherein the third lens has a variable refractive index that is equivalent to a surface which has a profile that follows a symmetrical mathematical function, and the fourth lens is defined by a function that is the conjugate complex of the symmetrical mathematical function.

8. The optical system with variable field of depth according to claim 6, wherein the optical system is configured to move the first or second lens relative to one another.

9. The optical system with variable field of depth according to claim 6, further comprising additional types of lenses.

10. The optical system with variable field of depth according to claim 6, further comprising an image processing system.

11. The optical system with variable field of depth according to claim 6, further comprising at least one positioning system for any of the first or second lenses.

12. An optical system with variable depth of field, comprising at least one pair of lenses, wherein each pair of lenses includes a first and a second lens, the first lens having a variable refractive index that is equivalent to a surface which has a profile that follows a symmetrical mathematical function, and the second lens of the pair is defined by a function that is the conjugate complex of the symmetrical mathematical function.

13. The optical system with variable field of depth according to claim 12, wherein the optical system is configured to move the first or second lenses relative to one another.

14. The optical system with variable field of depth according to claim 12, further comprising additional types of lenses.

15. The optical system with variable field of depth according to claim 12, further comprising an image processing system.

16. The optical system with variable field of depth according to claim 12, further comprising at least one positioning system for any of the first or second lenses.

* * * * *